Patented July 14, 1942

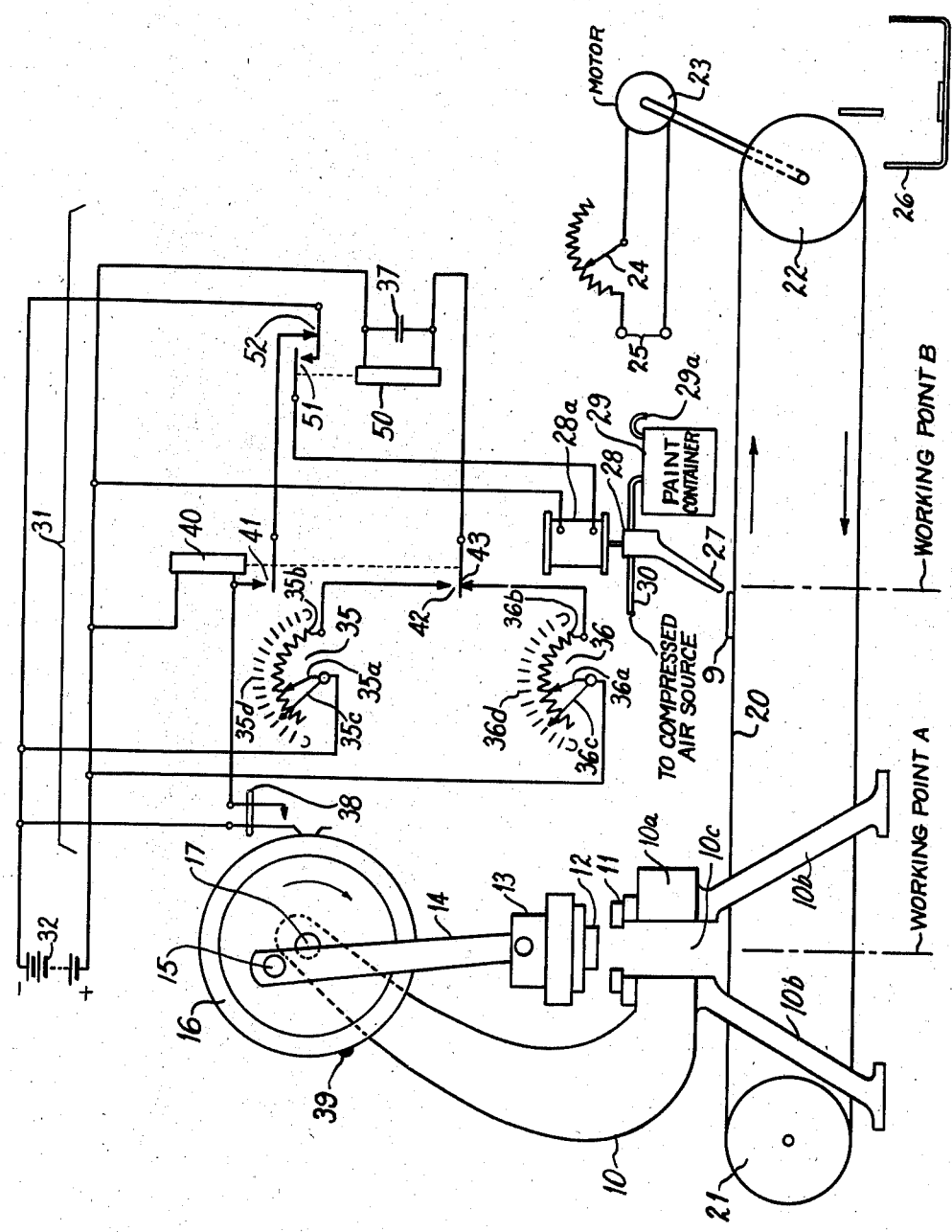

2,289,986

UNITED STATES PATENT OFFICE 2,289,986

CONTROL APPARATUS

Martin L. Nelson, Park Ridge, Ill., assignor to Associated Electric Laboratories, Inc., Chicago, Ill., a corporation of Delaware Application November 22, 1940, Serial No. 366,787

13 Claims. (Cl. 161—1)

The present invention relates to control apparatus and, more particularly, to improvements in apparatus for controlling the operation of the various pieces of equipment which may be associated with a production line or the like.

In certain applications, such, for example, as in finishing the work pieces or punchings delivered from a punch press or the like, it is expedient to operate on the work pieces at one or more working points as they are conveyed from the punch press to a hopper or final working point. For example, it may be economically expedient to subject the work pieces to a paint spray as they are delivered from the punch press to the hopper. Alternatively, it may be desirable to subject the work pieces to a cleansing bath at a first working point and to then spray-paint the punchings at a second working point as they are moved from the punch press to the hopper. Usually, it is desirable to operate the pieces of equipment provided at each working point only when a work piece is actually passing through the working point. In an application of this character the speed at which the punch press and the conveyer are operated may vary over a wide range, depending upon production schedules and the rate at which the stock can be fed to the press. Moreover, the dimensions of the work pieces may vary with different batches as the dies of the press are changed from time to time. These variations in conveyer speed and the dimensions of the work pieces render it difficult automatically to control the starting and stopping of the apparatus provided at the working point or points, so that the operation of each piece of equipment is initiated as each work piece enters the associated working point, and is maintained only so long as it is actually operating upon a work piece.

It is an object of the present invention, therefore, to provide improved control apparatus of the character noted, which is operative positively to correlate the production rate and the operation of the equipment provided at a given working point so that operation of the equipment is initiated as each work piece reaches the working point, regardless of the production rate or the speed of the conveyer.

It is another object of the invention to provide improved apparatus of the character described, which is operative to correlate the production, the dimensions of the work pieces, and the operation of the equipment provided at a given working point, so that operation of this equipment is arrested as each work piece leaves the working point, regardless of the production rate, the speed of the conveyer or the dimensions of the work piece.

It is a further object of the invention to provide improved apparatus of the character indicated, which is simple in arrangement, positive and reliable in operation, and economical to manufacture and install.

It is still another object of the invention to provide for controlling the equipment located at one of the working points, an improved electric circuit arrangement which includes a minimum of moving parts and is provided with independently adjustable impedance elements which are connected and arranged respectively to control the starting and stopping of the apparatus.

The invention is illustrated in its application to production apparatus which comprises a variable speed punch press arranged to deliver punchings of selected dimensions to an adjustable speed conveyer which functions to carry the punchings past a working point at which they are spray-painted, to a hopper. In accordance with the present invention, adjustable electric circuit means controlled in accordance with the movement of the work piece away from the punch press or first working point, and operative to measure a time interval and to initiate the operation of the spray-painting apparatus at the end of the measured interval, is provided. Apparatus is also provided for adjusting the setting of the electric circuit means to correlate the operation of the measured time interval, the production rate and the speed of the conveyer, so that the operation of the painting apparatus is initiated as each work piece is moved to the working point of the painting apparatus. The electric circuit means also functions to measure a second time interval, the beginning of which is concurrent with the starting of the operation of the painting apparatus, and to arrest the operation of the painting apparatus at the end of the second measured time interval. Additional means are provided for adjusting the setting of the electric circuit means, independently of the first-mentioned adjustment, to correlate the duration of the second measured time intervals and the dimensions of the work pieces so that the duration of each second measured time interval substantially equals the period required for moving one of the work pieces past the working point of the painting apparatus.

The novel features believed to be characteristic of the invention are set forth with particularity in the appended claims. The invention, both as to its organization and method of operation, together with further objects and advantages thereof will best be understood by reference to the specification taken in connection with the accompanying drawing in which the single figure of the drawing illustrates one embodiment of the invention in its application to apparatus for producing and finishing punchings.

Referring now, more particularly, to the single figure of the drawing, the apparatus there illustrated comprises a motor driven punch press 10, equipped with a stationary die 11 and a movable die 12 which is carried by the die head 13. The die head 13 is mounted upon the lower end of a vertically reciprocating arm 14. The upper end of this arm is rotatably connected with an eccentric pin 15, carried by a fly wheel 16. This wheel is rotatably mounted on a shaft 17 and may be either belt or gear driven by an adjustable speed motor, not shown. The base portion 10a of the press 10 is supported upon legs 10b, and is provided with an opening 10c extending through the central portion thereof, through which the punchings may be passed to a conveying system or hopper. Since the punch press 10 may be of any desired commercial construction, it has been only schematically illustrated in the drawing. It will be understood, however, that provisions are made therein for limiting the movement of the die head 13 to a straight line reciprocating vertical movement, the extent of which is sufficient to move the die 12 into and out of punching relationship with respect to the stationary die 11.

In the arrangement illustrated a conveyer system is provided which comprises an endless belt 20 carried by a rotatably mounted idler drum 21 and a power driven drum 22. The drum 22 may be either directly driven or may be driven through a suitable speed reducing gear box by an adjustable speed motor 23. Preferably, the motor 23 is of the direct current type, current being supplied to this motor through a speed controlling rheostat 24 from a source of direct current power, not shown, but connected to the terminals 25. The direction of rotation of the motor 23 is such that the belt 20 is driven in the direction indicated by the directional arrows.

With this conveyer system arrangement, each punching 9 delivered from the punch press 10 at the first working point A passes through the opening 10c and is deposited upon the upper side of the belt 20, to be conveyed to the hopper 26. At a second working point B along the belt 20 and located between the delivery point A of the press 10 and the hopper 26, spray-painting equipment is provided which comprises a spray nozzle 27, an electromagnetic controlled admission valve 28, a source of liquid paint 29 and a compressed air source, not shown, but communicating with the conduit 30. The interior of the container 29 is vented to atmospheric pressure by means of a vent pipe 29a. The construction of the nozzle 27 and the admission valve 28 may be entirely conventional. It will be understood, however, that when the admission valve 28 is closed the passage of compressed air into the mixing chamber of the valve is blocked, so that the spray from the nozzle 27 is cut off. When, however, the valve 28 is opened under the control of the operating magnet 28a, compressed air is passed into the mixing chamber of the valve and is discharged through the nozzle 27. As a result, liquid paint is drawn from the container 29 into the mixing chamber of the valve, and is discharged with the air stream through the nozzle 27.

For the purpose of controlling the operation and release of the operating magnet 28a, and incident thereto the spray from the nozzle 27, a control network 31 is provided. This network comprises a source of direct current 32, a start relay 40, a time measuring relay 50, a pair of rheostats 35 and 36, and a condenser 37 connected in shunt with the winding of the relay 50. More specifically, the two rheostats 35 and 36 are respectively included in the charging circuit and the discharge path for the condenser 37. As thus connected, these two adjustable circuit elements function to determine the operating and release periods, respectively, of the relay 50. The two rheostats may be mounted upon the control panel for the network 31, and each thereof is equipped with a uni-controlled movable contact and pointer assembly, preferably of the dial-operated type. Thus the rheostat 35 comprises a movable contact 35a cooperating with the resistance element 35b, and arranged to be operated in unison with a pointer 35c which coacts with an indicia bearing plate 35d to indicate the setting of the movable contact 35a. Similarly, the rheostat 36 comprises a movable contact 36a cooperating with the resistance element 36b, and arranged to be operated in unison with a pointer 36c which coacts with an indicia bearing plate 36d to indicate the setting of the movable contact 36a. For the purpose of initiating the operation of the network 31 each time a punching is delivered to the conveyer belt 20, through the opening 10c in the base 10a of the punch press 10, a pair of contact springs 38 are provided. These contact springs are mounted upon the frame of the punch press and are arranged to be moved into engagement by an insulating button 39 carried by one of the moving parts of the punch press, such, for example, as the fly wheel 16. More specifically, the insulating button 39 is arranged momentarily to engage the cam follower portion of the left contact spring 38, each time the die head 13 is moved to its lowermost position to complete a punching operation.

In operating the apparatus described above, the speed at which the punch press 10 operates to deliver punchings to the conveyer belt 20 is, of course, determined by the desired production schedule and the rate at which the stock can be fed to the punch press. The speed of the conveyer belt 20 is set accordingly by proper adjustment of the rheostat 24. If desired, the rheostats controlling the motor 23 and the driving motor for the punch press 10 may be uni-controlled, so that the operation of a single rheostat control element serves automatically to control the speed of both motors, and to maintain the proper relationship between the rate at which the punchings are produced and the speed of the conveyer belt 20.

Each time a punching 9 is delivered through the opening 10c of the base member 10a, the insulating button 39 operates momentarily to move the contact springs 38 into engagement, thereby momentarily to complete an obvious circuit for energizing the start relay 40 from the current source 32. This relay, in operating, closes its contacts 41 to complete a locking circuit for itself which extends from the positive terminal of the current source 32 by way of the winding of the relay 40 and the contacts 41 and 52, to the negative terminal of the current source. At its contacts 43, the relay 40 opens the normally completed discharge path for the condenser 37. At its contacts 42, the relay 40 completes the charging circuit for the condenser 37, this charging circuit extending from the positive terminal of the current source 32 through the condenser 37, the contacts 42, the resistance element 35b and the movable contact 35a, to the negative terminal of the current source. When this circuit is completed, a charge starts to accumulate upon the condenser 37 and, incident to the building up of this charge, the voltage across the winding of the relay 50 is increased. After a time interval, determined by the capacitance and resistance values of the condenser 37 and the portion of the resistor 35b included in the charging circuit, the voltage across the shunt connected condenser 37 and winding of the relay 50 exceeds that required to cause operation of this relay. When this voltage is reached the relay 50 operates. In this circuit the time interval elapsing between the operation of the relay 40 and the operation of the relay 50 is proportional to the product of the resistance value of the resistor 35b and the capacitance value of the condenser 37. Accordingly, by proper adjustment of the rheostat 35, the relay 50 may, within limits, be caused to operate any desired time interval following engagement of the contacts 38. For example, if the voltage of the current source 32 is 115 volts, the relay 50 is equipped with a winding having a resistance of 11,300 ohms, a condenser 37 is provided having a capacitance of 250 microfarads and the resistance of the rheostat 35 is adjustable between 200 and 15,000 ohms, the time interval elapsing between the operation of the relays 40 and 50 may, by adjustment of the movable contact 35a along the resistor 35b, be varied from a negligible value to a value in excess of two seconds. This period represents a measured time interval during which the punching 9 deposited on the belt 20 is conveyed from the point of deposit, or working point A, either to the working point B at which the punching is to be sprayed or to a point intermediate the working points A and B.

In operating, the relay 50 closes its contacts 51 to complete a circuit for energizing the operating magnet 28a of the admission valve 28, this circuit extending from the positive terminal of the current source 32 through the winding of the magnet 28a and the contacts 51 to the negative terminal of the source 32. When thus energized the magnet 28a attracts the solenoid controlled thereby to move the port closure member of the valve 28 so that compressed air is admitted to the mixing chamber of this valve. The compressed air passing through the mixing chamber and discharged through the nozzle 27 serves to withdraw paint from the container 29. The withdrawn paint is intermixed with the air stream and discharged through the nozzle 27 as a spray which envelopes the work piece 9, providing the work piece has been moved by the conveyer 20 from the work point A to the work point B. It will be apparent that by properly adjusting the rheostat 35 to control the operating period of the relay 50, the spray discharge from the nozzle 27 may be started substantially coincident with the entrance of the leading edge of the work piece 9 into the spray zone. Alternatively, the arrangement may be such that any work piece deposited on the conveyer 20 is moved only a fraction of the distance between the work points A and B during the time interval elapsing between the deposit of the work piece on the conveyer and the starting of the spray. For example, the work piece may be moved only one fourth the distance between the working points A and B during the measured time interval. In such case, the spraying of a given work piece starts incident to the deposit of the work piece produced after three additional punching operations on the part of the press 10. Here, again, by properly adjusting the rheostat 35 to control the operating period of the relay 50, the spray discharge from the nozzle 27 may be started substantially coincident with the entrance of the leading edge of each work piece into the spray zone.

The relay 50, in operating, also opens its contacts 52 to interrupt the above-traced holding circuit for the start relay 40, causing the latter relay to restore. In releasing, the relay 40 opens its contacts 41 further to interrupt its locking circuit; opens its contacts 42 to interrupt the charging circuit for the condenser 37, and closes its contacts 43 to complete the discharge path for the condenser 37, this path including the contacts 43 and the resistance element 36b. When this discharge path is completed the condenser 37 is discharged through the winding of the relay 50 and the resistor 36b in parallel. As the condenser 37 discharges, the current traversing the winding of the relay 50 decays until the magnitude thereof is less than that required to hold the relay operated. When the current traversing the winding of the relay 50 is decreased below the holding value, the relay 50 restores and opens its contacts 51 to interrupt the above-traced circuit for energizing the operating magnet 28a. When this magnet is deenergized the admission valve 28 is closed to cut off the paint spray from the nozzle 27. At its contacts 52, the relay 50, in restoring, reprepares the holding circuit for the start relay 40.

From the above explanation it will be apparent that the rate at which the condenser 37 is discharged, following the release of the start relay 40, determines the length of the release period for the relay 50. The discharge rate of the condenser 37 is determined by the setting of the rheostat 36. Accordingly, by properly adjusting the rheostat 36 the release period of the relay 50 may be controlled so that the spray from the nozzle 27 is cut off at the exact instant the trailing edge of the work piece 9 leaves the working point B. If the above-described circuit constants are used in the circuit, a wide variation in the release period of the relay 50 may be obtained by providing a rheostat 36 having a resistance element 36b, the resistance of which is variable between 200 and 10,000 ohms.

The operation of the network 31 as described above is repeated each time the insulating button 39 operates momentarily to close the contact springs 38, incident to the deposit of a punching on the conveyer belt 20 at the working point A. It will be apparent from the described mode of operation of this circuit that the setting of the rheostat 36 is partially determined by the speed of the conveyer belt 20 and partially determined by the dimensions of the punchings in the direction of movement of the conveyer belt. In order to start and stop the spray at the proper instants the operation of the spray-painting equipment may be observed concurrently with adjustment of the rheostats 35 and 36. Obviously, after the two rheostats 35 and 36 are adjusted for any particular run, no further adjustment is required. Moreover, so long as the punching rate and the size of the punchings are not changed, the settings imparted to the rheostats 35 and 36 may be retained. When, however, the punching rate or the conveyer speed is changed, new settings must be imparted to both of the rheostats in order to obtain the proper response of the painting equipment. On the other hand, if the dies 11 and 12 of the punch press 10 are changed to produce punchings of different dimensions, without changing the production rate or conveyer speed, only the rheostat 36 needs to be readjusted to increase or decrease the spray intervals in accordance with the increase or decrease in the dimensions of the punchings.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In combination, a conveyer for moving work pieces from a first working point to a second working point, apparatus for operating on said work pieces at said second working point, an electromagnetic control device operative to initiate the operation of said apparatus, an operating circuit for said control device, means for completing said operating circuit each time a work piece leaves said first working point, and reactance means included in said circuit to delay the operation of said control device until each work piece reaches said second working point.

2. In combination, a conveyer for moving work pieces from a first working point to a second working point, apparatus for operating on said work pieces at said second working point, an electromagnetic control device operative to initiate the operation of said apparatus, an operating circuit for said control device, and means for completing said circuit each time a work piece leaves said first working point, said circuit including reactive and resistive components so proportioned that the operation of said control device is, following completion of said circuit, delayed until the work piece reaches said second working point.

3. In combination, a conveyer for moving work pieces from a first working point to a second working point, apparatus for operating on said work pieces at said second working point, an electromagnetic control device operative to initiate the operation of said apparatus, an operating circuit for said control device, said circuit including reactive and resistive components proportioned to delay the operation of said device for an interval following the completion of said circuit, means for completing said circuit each time a work piece leaves said first working point, and means for adjusting at least one of the components of said circuit so that the operation of said apparatus is initiated as each work piece reaches said second working point.

4. In combination, a conveyer for moving work pieces from a first working point past a second working point, the work pieces constituting different batches having different dimensions in the direction of movement of the conveyer, apparatus for operating on said work pieces as they move past said second working point, a control circuit including means controlled in accordance with the movement of said work pieces away from said first point and operative to measure a time interval, to initiate the operation of said apparatus at the beginning of each measured interval and to arrest the operation of said apparatus at the end of the measured time interval, said circuit including an impedance element having an impedance which may be varied to vary the duration of each of said time intervals; and means for varying the impedance of said element, thereby to correlate the duration of the measured time intervals and the dimensions of the work pieces so that the duration of each measured time interval substantially equals the period required to move one of said work pieces past said second working point.

5. In combination, a conveyer for moving work pieces from a first working point past a second working point, apparatus for operating on said work pieces as they move past said second working point, a control device operative to control the operation of said apparatus, an operating circuit for said control device, means for controlling said circuit so that said control device operates as each work piece reaches said second working point and said circuit is opened substantially concurrently with the operation of said control device, and reactance means included in said circuit to delay the release of said control device until each work piece has moved past said second working point.

6. In combination, a conveyer for moving work pieces from a first working point past a second working point apparatus for operating on said work pieces as they move past said second working point, a control device operative to control the operation of said apparatus, an operating circuit for said control device, means for controlling said circuit so that said control device operates as each work piece reaches said second working point and said circuit is opened substantially concurrently with the operation of said control device, said circuit including, after the operation of said control device, reactive and resistive components so proportioned that the release of said control device is delayed until each work piece has moved past said second working point.

7. In combination, a conveyer for moving work pieces from a first working point past a second working point, the work pieces constituting different batches having different dimensions in the direction of movement of the conveyer, apparatus for operating on said work pieces as they move past said second working point, a control device operative to control the operation of said apparatus, an operating circuit for said control device, means for controlling said circuit so that said control device operates as each work piece reaches said second working point and said circuit is opened substantially concurrently with the operation of said control device, said circuit including, after the operation of said control device, reactive and resistive components proportioned to delay the release of said control device for an interval, and means for adjusting at least one of the components of said circuit to correlate the duration of the delay intervals and the dimensions of the work pieces so that each delay interval substantially equals the period required to move one of said work pieces past said second working point.

8. In combination, a conveyer for moving work pieces from a first working point past a second working point, the work pieces constituting different batches having different dimensions in the direction of movement of the conveyer, apparatus for operating on said work pieces as they move past said second working point, a circuit including control means controlled in accordance with the movement of said work pieces away from said first working point and operative to measure a first time interval, to initiate the operation of said apparatus at the end of said first time interval, to measure a second time interval and to arrest the operation of the apparatus at the end of said second time interval, said circuit including impedance means for determining said first time interval so that said control means is operated to initiate the operation of said apparatus as each work piece is moved to said second working point, and additional impedance means included in said circuit to correlate the duration of the second measured time intervals and the dimensions of the work pieces so that the duration of each second measured time interval substantially equals the period required to move one of said work pieces past said second working point.

9. In combination, a conveyer for moving work pieces from a first working point past a second working point, apparatus for operating on said work pieces as they move past said second working point, an electromagnetic control device operative to control the operation of said apparatus, an operating circuit for said device, means for completing said circuit each time a work piece leaves said first working point and for opening said circuit each time said control device operates, and reactance and resistance elements included in said circuit to delay the operation of said apparatus until each work piece reaches said second working point and to delay the release of said control device until each work piece has moved past said second working point.

10. In combination, a conveyer for moving work pieces from a first working point past a second working point, the work pieces constituting different batches having different dimensions in the direction of movement of the conveyer, apparatus for operating on said work pieces as they move past said second working point, an electromagnetic control device operative to control the operation of said apparatus, an operating circuit for said device, means for completing said circuit each time a work piece leaves said first working point and for opening said circuit each time said control device operates, said circuit when completed including resistive and reactive components proportioned to delay the operation of said control device for a first time interval and when opened including resistive and reactive components proportioned to delay the release of said control device for a second time interval, and means for adjusting at least one of said components so that said control device operates as each work piece reaches said second working point and to correlate the duration of the second delay intervals and the dimensions of the work pieces so that said control device releases as each work piece leaves said second working point.

11. In combination, a conveyer for moving work pieces from a first working point past a second working point, the work pieces constituting different batches having different dimensions in the direction of movement of the conveyer, apparatus for operating on said work pieces as they move past said second working point, an electromagnetic control device having a winding and operative to control the operation of said apparatus, a condenser shunting said winding, circuits for charging and discharging said condenser, said circuits respectively including resistance components for delaying the operation and release of said control device, means for completing said charging circuit each time a work piece leaves said first working point and for interrupting said charging circuit and completing said discharging circuit each time said control device operates, means for adjusting the resistance component of said charging circuit so that said control device operates as each work piece reaches said second working point, and means for adjusting the resistance component of said discharge circuit to correlate the release delay of said control device and the dimensions of said work pieces so that said control device releases as each work piece leaves said second working point.

12. In combination, a control device including a winding, a circuit for energizing said winding, said circuit including a source of direct current and an adjustable resistor, a condenser shunting said winding and operative to delay operation of said control device until the charge on said condenser attains a predetermined value, means for completing said circuit, means for adjusting said resistor, thereby to vary the charging rate of said condenser and thus change the operating time of said control device, a discharge path for said condenser, said discharge path including a second adjustable resistor, means responsive to operation of said control device for opening said circuit and for completing said path, and means for adjusting said second resistor to change the discharge rate of said condenser and thus change the release time of said control device.

13. In combination, a control device including a winding, a circuit for energizing said winding, said circuit including a source of direct current and an adjustable resistor, a condenser shunting said winding and operative to delay operation of said control device until the charge on said condenser attains a predetermined value, a relay operative to complete said circuit, a holding circuit for said relay completed in response to operation of said relay, means for momentarily energizing said relay at spaced intervals, means for adjusting said resistor, thereby to vary the charging rate of said condenser, a discharge path for said condenser, said discharge path including a second adjustable resistor, means responsive to operation of said control device for opening said holding circuit, said relay in releasing being operative to open said first-named circuit and to complete said path, and means for adjusting said second resistor to change the discharge rate of said condenser and thus change the release time of said control device.

MARTIN L. NELSON.